United States Patent [19]
König et al.

[11] Patent Number: 5,725,608
[45] Date of Patent: Mar. 10, 1998

[54] PROCESS AND APPARATUS FOR MATERIAL SEPARATION BY CRYSTALLIZATION FROM THE MELT

[75] Inventors: Axel König, Stuttgart; Joachim Ulrich, Bremen, both of Germany; Oskar Fischer, Buchs, Switzerland

[73] Assignee: Santrade Ltd., Lucerne, Switzerland

[21] Appl. No.: 581,595

[22] PCT Filed: Apr. 28, 1995

[86] PCT No.: PCT/EP95/01617

§ 371 Date: Mar. 29, 1996

§ 102(e) Date: Mar. 29, 1996

[87] PCT Pub. No.: WO95/30466

PCT Pub. Date: Nov. 16, 1995

[30] Foreign Application Priority Data

May 5, 1994 [DE] Germany ............... 44 15 844.0

[51] Int. Cl.$^6$ ............... B01D 9/00; C07L 7/14
[52] U.S. Cl. ............... 23/295 R; 422/245.1; 422/254; 585/812
[58] Field of Search ............... 23/293 S, 295 R; 422/245.1, 254; 585/812

[56] References Cited

U.S. PATENT DOCUMENTS

| | | | |
|---|---|---|---|
| 2,659,761 | 11/1953 | Frevel et al. | 23/295 R |
| 3,038,789 | 6/1962 | Bennett et al. | 422/254 |
| 3,885,920 | 5/1975 | Ellithorpe | 23/293 S |
| 3,932,142 | 1/1976 | de Vries et al. | 422/254 |
| 4,119,744 | 10/1978 | Brissot et al. | 23/295 R |
| 5,269,817 | 12/1993 | Schermutzki et al. | 23/295 R |
| 5,326,541 | 7/1994 | Ulrich et al. | 422/254 |
| 5,445,108 | 8/1995 | Schermutzki et al. | 422/254 |

FOREIGN PATENT DOCUMENTS

| | | | |
|---|---|---|---|
| 1 001 386 | 12/1976 | Canada. | |
| 939030 | 6/1982 | U.S.S.R. | 422/254 |
| 1124995 | 11/1984 | U.S.S.R. | 422/254 |
| 1274712 | 12/1986 | U.S.S.R. | 422/254 |

*Primary Examiner*—Gary P. Straub
*Attorney, Agent, or Firm*—Burns, Doane, Swecker & Mathis, L.L.P.

[57] ABSTRACT

Crystallization of a melt is induced by causing the melt to flow downwardly in a gap which is defined by upwardly moving cooled walls so that crystallate adheres to the walls and is carried upwardly for recovery. The walls are formed by endless belts which are cooled by fluid sprayed from nozzles. The walls are adjustable so as to be parallel or upwardly divergent.

16 Claims, 3 Drawing Sheets

PROCESS AND APPARATUS FOR MATERIAL SEPARATION BY CRYSTALLIZATION FROM THE MELT

BACKGROUND OF THE INVENTION

The invention pertains to a process and an apparatus for material separation by crystallization from the melt, in which the melt is introduced into a gap between two opposing walls in motion which can both be cooled, remains as a crystallate adhering to at least one wall and is conveyed out of the gap and collected.

A process and an apparatus of that type is known from DE 40 41 670-C (corresponding to U.S. Pat. No. 5,445,108), in which two continuous belts are installed one above the other such that their sides facing one another run horizontal and parallel to one another. The lower belt is constructed somewhat longer than the upper and has an upstream section extending past the upper belt to receive the melt. The lower belt, which is a steel belt, is tempered such that the melt remains above its crystallization point. The upper belt, in contrast, likewise made of steel and cooled from the interior, is brought to a temperature at which a crystal layer can form upon it. Since the upper belt is brought into contact with the melt and runs in a direction opposite to the melt conveyed by the lower belt, the crystal layer clinging to the upper belt can be conveyed out of the gap and then mechanically removed in the vicinity of a return roll. In this known process only one conveyor wall is available for production of crystallate, the other assumes transport and temperature maintenance functions.

An advantage of such processes and installations is that a continuous crystallate formation is achieved compared to processes and apparatuses which function with, for example, vertically cooled or heated walls of parallel robes, in which a fluid mixture flows inside the robes as a trickling film downward from the top, while the cooling medium is located outside the tubes. Such processes and apparatuses can only be operated non-continuously.

However, an installation for material separation by continuous crystallization was made known (EP 0 488 953 A1) in which an inclined cooled continuous belt is used which is cooled on its upper side from the inside and is provided with charging locations for a fluid mixture or a melt over this upper side. In this set-up, as well, the crystal build-up proceeds on one wall surface only and the inclination of the belt is only then used to carry the mother liquor away downward at an angle.

Finally, a vertical channel formed by moving belts is known, as in FR-A 2 182 168, in which the fluid medium is filled upward. In this design, the channel is formed from the four inner sides of four continuous vertical belts and has a square cross section. The belts travel such that the sides facing the channel travel downward. At least two opposing belts are cooled or heated so that crystals form on them which are conveyed downward to a grinder and crashed. The residual fluid gravitates also to the area of the grinder. The recovery of the solid substances can thus be impaired.

In contrast, the objective of designing a process and apparatus of the type named above, but more effectively, is the basis of this invention.

SUMMARY OF THE INVENTION

To meet this objective, the process according to the invention is provided with both walls moving in the same direction and in essentially a vertical direction upward, and the melt is introduced into the gap countercurrent to the motion of the walls with the crystallate clinging to them. With this type of process, both walls moving upward can be utilized for formation of crystallate. The yield from installations according to this process can then be doubled. The gravitation is utilized in order to move the melt countercurrent to the walls. The process can be very easily implemented, then, if the melt is prepared for corresponding heating prior to feed to the gap.

An advantageous development of the process according to the invention arises when the walls are moved with differing velocities and/or a differing cooling is undertaken in the direction of motion. Through these measures, it is possible to produce crystallate at differing conditions or to effectively influence the speed of crystal formation.

By implementing the process according to the invention, an apparatus is provided which is characterized by two continuous, metal belts, each guided by a return pulley, whose sides facing one another run approximately vertical and form the gap, is also characterized by tempering installations which are arranged on the inside of the belts opposite to the gap and by a feed arrangement for the melt arranged on the upper end of the gap. It can then be arranged so that the return pulleys are located in a support structure such that it is possible to adjust the ends of the belts facing each other to a small angle to one another whose vertex lies beneath the gap. With this arrangement, the gap can be opened somewhat opposite to the flow direction of the melt so that the thickness of the two crystal layers forming on the belts can be compensated for and melt can be introduced between them countercurrent from the feed installation into the gap.

BRIEF DESCRIPTION OF THE DRAWING

Further advantages and features are contained in the subclaims as well as in the following description of examples of embodiments oft he process according to the invention and the apparatuses designed for this purpose which are represented in the illustrations. Shown in the illustrations are;

DETAILED DESCRIPTION OF PREFERRED EMBODIMENTS

Figure 1:
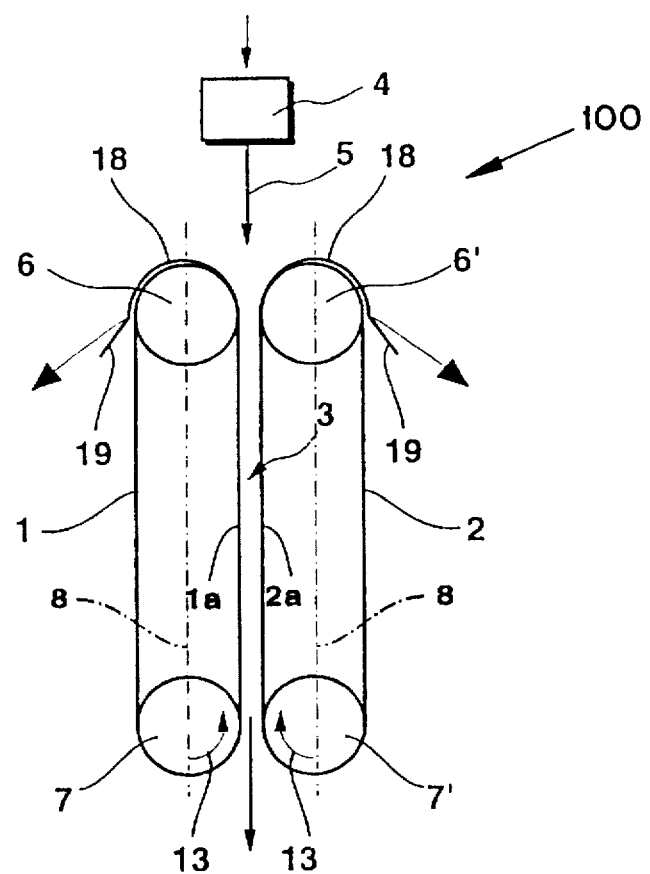
FIG. 1 A schematic side view of an apparatus according to the invention.

In FIG. 1, an assembly (100) is shown with two continuously cycling metal belts, in particular steel belts (1 and 2), which are intended to produce material separation by crystallization from a melt. The two cycling belts (1 and 2) form a gap (3) between their two opposing sides (1a and 2a), into which a melt with a certain temperature is fed from a feed arrangement (4) in the direction of the arrow (5) from above. The belts (1 and 2) are each guided around return pulleys (6 and 7, 6' and 7', respectively), which are of equal size in the embodiment example. The imaginary connecting lines (8) interconnecting the axes of rotation of the pulleys (6, 7, 6', 7') of each belt extend approximately parallel to one another. Not shown is a supporting structure in which the return pulleys (6, 7, 6', 7') are mounted to guide the respective belts (1 and 2) and also not shown is the mobility of the axes of these return pulleys enabling the two connecting lines (8) to be exactly parallel to one another, or tilted relative to one another by a certain small angle whose vertex is beneath the two facing sides (1a, 2a) of the lower return pulleys (7, 7'). The two belts (1 and 2) can thus form a slight wedge-shaped gap which opens somewhat on top to the feed opening (4). This feature is disclosed later in the embodiment depicted in FIG. 6.

Figure 2:
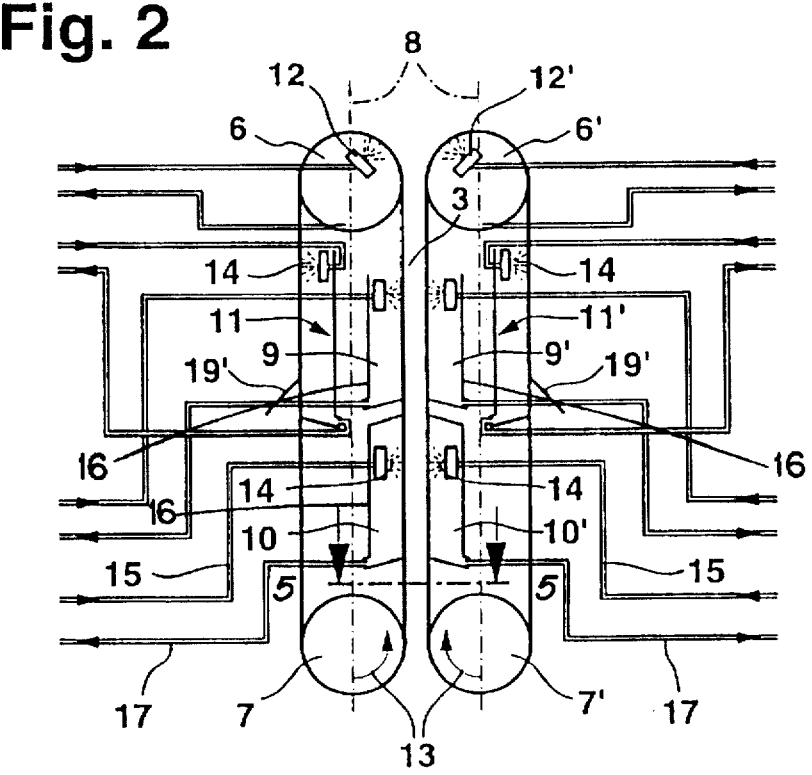
FIG. 2 The apparatus of FIG. 1 in its set-up with various cooling zones.

As seen in FIG. 2, cooling installations (9, 10, 9', 10', and 11, 11', 12, 12', respectively) are arranged in the interior of the hollowly constructed return pulleys (6, 6', 7, 7') as well as in the interior of the cycling belt loops (1 and 2). Each cooling installation (10 and 10') is facing the gap (3) in the traveling direction of the belt identified by the arrows (13). This traveling direction is chosen so that the two inner sides (1a and 2a) each move in the same upward direction and opposite to the feed downward direction (5) of the melt. Each cooling installation is constructed with spray nozzles (14) which are arranged inside a chamber (16) and spray a cooling medium onto the interior of the belt side (1a or 2a) which is then collected inside the sealed chamber (16) and recycled again. The spray nozzles (14) are subjected to a pressurized spray medium through supply lines (15). The returning cooling medium is conveyed back over lines (17). The same applies for the other spray nozzles for the other cooling installations (9, 9' and 11, 11', or 12, 12'). The return of cooling medium from the hollow rolls (6, 6') proceeds from the lower lateral region of the rolls (6, 6').

With the arrangement of the two sets of cooling installations for the respective belts, it is possible to cool the belt sides (1a and 2a) variably in their direction of motion. Still more cooling zones could also be provided, naturally. This can be utilized advantageously for a specific crystal formation.

The same holds for the additional cooling installations (12, 12') inside the return pulleys (6, 6').

Besides the various possibilities for cooling of the belts (1, 2) in their directions of motion, it is also possible, naturally, to variably choose the speed of the two belts (1 and 2) so that, for example, the left belt (1) runs faster than the right belt (2). The crystal formation can be influenced by the variable crystal formation times and/or by the variable tempering.

In the process according to the invention crystal layers form on each of the belts (1 and 2) in the area of the gap by the cooling of the inner belt sides (1a and 2a). The crystal layer thicknesses increase in the direction of motion (13) of the belts. Depending on the thickness of the crystal layer expected in the area of the upper return pulleys (6 and 6') the connecting lines (8, 8') of the two belts (1 and 2) can be adjusted to an angle, as mentioned above, in order to avoid an encrustation of the gap (3) at the feed position so that despite the formation of crystal layers, a sufficient mount of melt can be fed. This allowance for adjustment makes it possible as well to change the volume of the melt in the gap (3). This is covered further in the explanation of FIG. 6.

The crystal layers (18) (FIG. 1) can be taken off by doctor blades (19) in the vicinity of the upper return pulleys (6, 6'). FIG. 2 shows, however, that it is possible to shift such a doctor blade (19) further down in order to subject the crystallate to yet another stripping or washing step, for example with the two tempering installations (11, 11') which can influence the exterior of the belts (1 and 2), before the crystallate is taken off.

Figure 3:
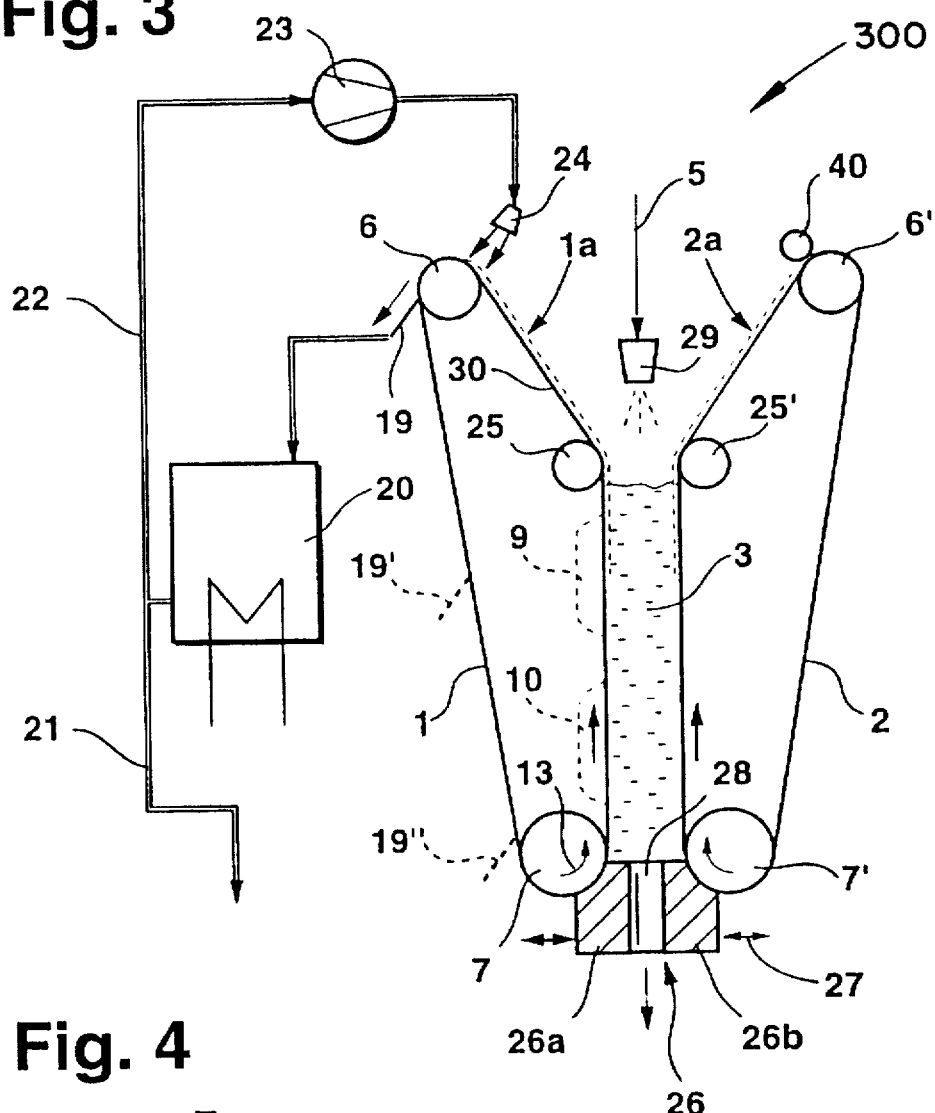
FIG. 3 A schematic side view of another embodiment of an apparatus according to the invention with the facility for additional "washing" of the crystallate, FIG. 4 A schematic representation of the properties of the melt, from which a material is to be extracted according to the invention process, FIG. 5 A cross section taken along FIG. 5—5 in FIG. 2, and FIG. 6 A schematic side view of another embodiment according to the invention.

FIG. 3 shows a variation of an apparatus (300) according to the invention insofar as the two continuous belts (1) and (2) are each guided around three return rolls (6, 7, and 25) and (6', 7', and 25'). In this way, respective leading belt sections (1a) or (2a), which do not run vertically but rather are tilted upward, arise in front of the inlet region of the gap (3), where the sides of the belts 1 and 2 facing one another run essentially parallel to one another. This section can be used for the so-called washing of the crystallate, which will be covered further. This region can naturally also be heated so that it can be used for the so-called "stripping".

In the embodiment design of FIG. 3, the exit cross section of the gap 3 is restricted by a throttle (26) which consists of two sections sealed against each of the two lower return pulleys (7) and (7') and two sections (26a) and (26b) across from these sealing sections which are adjustable in the direction of the arrows (27). With the help of these sections, the breadth of the exit opening gap (28) can be adjusted. The feed of the melt proceeds in the direction of the arrow (5) from a distributor (29). The feed of melt must naturally coincide with the outflow through the opening (28) such that the space inside the gap (3) is sufficiently filled with melt and does not run over. By adjusting the size of the outflow gap (28), the residence time of the melt in the gap (3) can be adjusted—also depending on the volume of the melt in the gap (3)—which can again influence the crystal formation process together with the cooling possibilities provided by installations (9) and (10) (which are naturally provided inside of belt (2) the same way as inside belt (1)).

In the embodiment of FIG. 3, a crystal layer grows on the outside of both belts (1) and (2) in the gap (3) region, which, illustrated by the dashed line, is conveyed upward along the inclined section (1a) (analogously also along section 2a). This crystal layer (30) is then located in a region outside the gap (3) and thus outside the melt as well. It is possible, as shown in FIG. 3, to set a doctor blade (19) or the like against the return pulley (6) and to take off the crystallate clinging to the belt (1) and feed it to a heated container (20). Again, molten crystallate can be taken from this container (20) with a higher temperature than before either through line (21) as a finished product or fed through line (22) and pump (23) to a spray head (24) from which the crystallate can be "self-washed" on the belt section (1a) with the melt from the crystal layer (30).

FIG. 3 shows on the right belt (2), for example, that it is not only also possible to arrange installations for "washing" on the upper inclined belt section (2a), but also that, for example, a pressing roll (40) and heating installations (not shown) can be arranged such that the crystallate conveyed on section (2a) comes to the "stripping" section and the stripped components can be squeezed out by the pressing roll (40) and can run back into the gap (3). The recovered crystallate can thus be purified further and be freed of undesirable components before removal.

Figure 4:
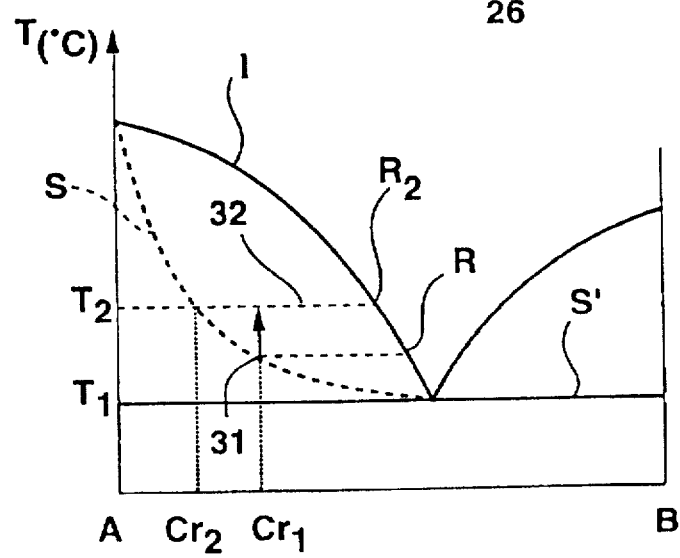
Figure 6:
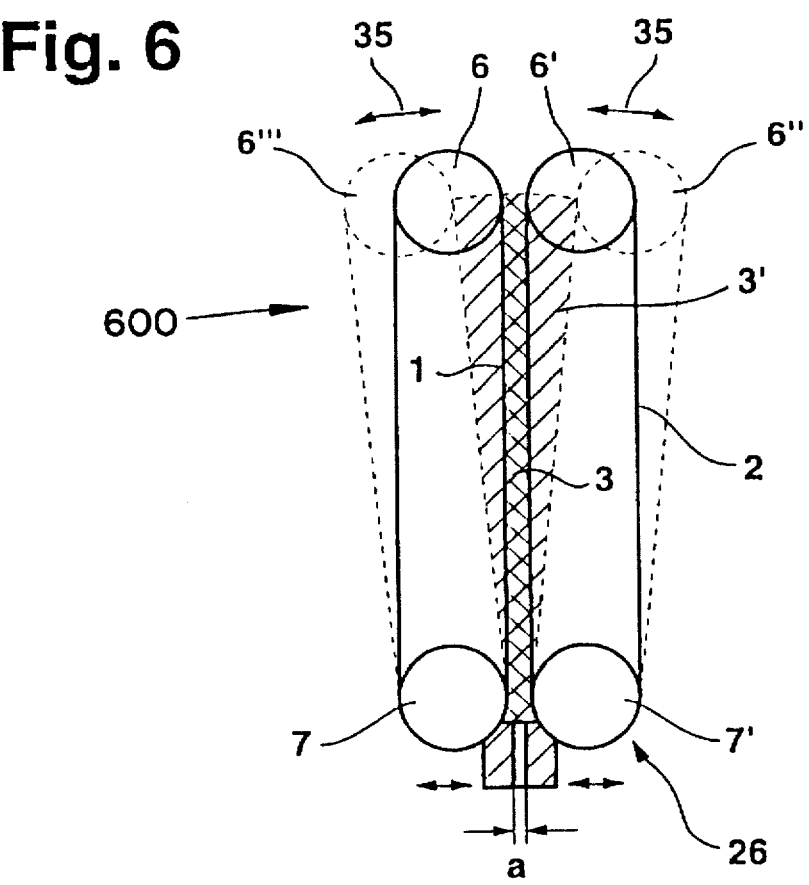

The process according to FIGS. 1, 3 and 6 of the invention is represented in FIG. 4 and unfolds in known fashion. In FIG. 4, the melt is assumed to comprise materials A and B, with material A being the material to be extracted via crystallization. The properties of the two materials A and B and their eutectic behavior are represented in relation to the temperature; "l" identifies the path of the fluid phase, "s" identifies the path of the solid phase of the material A (practical solidus line), whose concentration is 100% on the left side of the diagram and 0% on the right side (at B). The theoretical solidus line is identified by S'. If the temperature of the melt in gap (3) is, for example, brought to temperature ($T_1$) with the cooling installations (9) and (10), crystallate arises at point (31) which is identified by $Cr_1$ and which has a certain purity (of material A). At the same time the fluid reflux components, identified by R, remain which are fed back in the gap (3) and can leave the gap (3) through opening (28).

If the crystallate with concentration ($Cr_1$) at (19) is removed and brought to temperature ($T_2$), then the horizontal line (32) in the diagram of FIG. 4 is reached, which leads to a crystallate with concentration ($Cr_2$) and corresponding reflux ($R_2$). The crystallate with concentration ($Cr_2$) is purer that the previously recovered product. In the washing procedure, which can be carried out with the installation of FIG. 3, a purer crystallate can thus be recovered.

Figure 5:
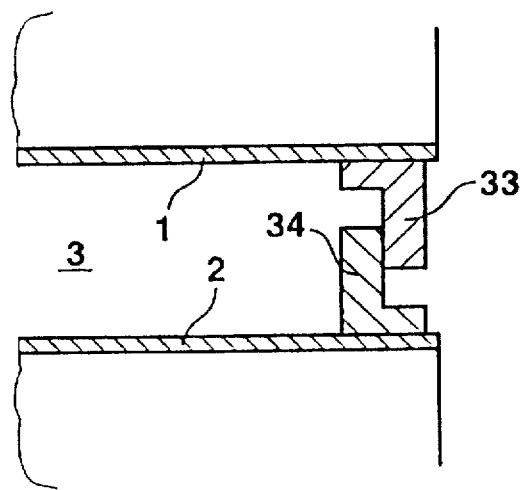

In FIG. 5, it is seen how the lateral sealing of the two belts (1) and (2) running parallel to each other can be achieved in order to prevent a leakage of melt at the two lateral edges of the belts (1) and (2). Both belts have angled seals (33) and (34) such that a shank of each of these angles (33) and (34) fits to a sealed seat on the other shank. These seals (33) and (34) are telescopically movable with respect to one another. They thus allow a certain enlargement of the cross section of the gap (3), which, for example, can occur by a modification of the distance between the rotating axes of the rolls (6, 6') on one hand and the return rolls (7, 7') on the other. Naturally, it would also be possible to adjust the size of the outlet gap by an opposing adjustment of the return rolls (7) and (7'). However, the throttling device in FIG. 3 (26) allows a considerably more fine adjustment of the exiting cross section.

FIG. 6 shows, finally, another modified assembly (600) which provides for adjustment of the size of the gap (3) with the goal of modifying the volume of the gap (3) as well.

FIG. 6 makes it clear that a lateral shift of the return rolls (6) and (6') in the direction of the arrows (35) about the respective axes of the lower return rolls (7) and (7') results in a gap (3') (broken lines) of wedge shaped cross section. This wedged gap (3') has a considerably greater volume than gap (3) formed when the opposing sides of the belts are parallel to one another (solid lines). With the opposite tilting of the belts (1) and (2), therefore, the volume of the melt in the gap (3, 3') can be influenced. Since the residence time of the product is $$V_R/V$$

where $V_R$ is the volume in the gap (3,3') and V is the exit velocity in cross section (28), the residence time of the product can be influenced by lilting the belts (1) and (2) as shown in FIG. 6 as well as by the adjustment of the size of the exit cross section (28). Once again, a specific and desired influence on the crystallate formation can be undertaken here.

The apparatuses according to the invention all have the advantage of a relatively small space requirement at their bases due to the essentially vertical belts. They thus require a smaller set up area.

We claim:

1. A process of inducing crystallization in a melt, comprising the steps of:

A) forming a vertical gap between opposed upright sections of respective movable endless belts;

B) introducing a melt into an upper end of the gap for downward travel therein;

C) cooling the upright sections;

D) moving the cooled sections upwardly during steps B and C such that crystallization occurs in the melt, and crystallate clings to at least one of the cooled sections and is conveyed thereby upwardly and out of the gap; and E) removing the crystallate from the at least one cooled section.

2. The process according to claim 1, wherein step C comprises cooling each of the upright sections such that the temperature thereof varies a vertical direction.

3. Apparatus for inducing crystallization in a melt, comprising:

driven endless belts including respective upright sections situated opposite one another to form a gap therebetween;

a cooling mechanism for cooling the upright sections;

a feeder for feeding a melt into an upper end of the gap for downward flow therein as the cooled sections move upwardly such that crystallization occurs in the melt, and crystallate clings to at least one of the cooled sections and is conveyed thereby upwardly and out of the gap for recovery from the at least one cooled section.

4. The apparatus according to claim 3, wherein the cooling mechanism is arranged to cool a surface of the each upright section facing away from the gap.

5. The apparatus according to claim 4, wherein the cooling mechanism includes a chamber disposed within each belt, each chamber including a nozzle for spraying cooling fluid against the surface of the respective upright section.

6. The apparatus according to claim 4, wherein each belt includes a downwardly moving section situated opposite the upwardly moving section; and a crystallate removal device being arranged to remove crystallate from the downwardly moving section.

7. The apparatus according to claim 6, wherein the crystallate removal device comprises a doctor blade.

8. The apparatus according to claim 4 including pairs of return pulleys around which respective ones of the belts extend, a pulley of each pair of pulleys being hollow, the cooling mechanism further arranged for cooling an inside surface of the hollow pulley.

9. The apparatus according to claim 3, wherein the walls are adjustable between parallel and mutually angled relationships, the mutually angled relationship forming a downwardly narrowing gap.

10. The apparatus according to claim 3 further including a throttle at a lower end of the gap for adjusting the rate of outflow of melt.

11. The apparatus according to claim 10, wherein the throttle includes a pair of sections movable toward and away from one another.

12. The apparatus according to claim 3, wherein lower portions of the upright are parallel, and upper portions of the upright sections are divergent in an upward direction.

13. The apparatus according to claim 12 further including a mechanism for conducting a liquid phase of the recovered crystallate to a sprayer positioned for spraying the liquid phase onto the upper portions of the upright sections.

14. The apparatus according to claim 12, wherein each of the belts extends around upper and lower return pulleys that are offset from one another in a horizontal direction.

15. The apparatus according to claim 14 including a crystallate removal device disposed adjacent the upper return roll of at least one of the upright sections for removing therefrom crystallate and a liquid phase thereof; a heater for reheating the liquid phase; and a pump for conducting the heated liquid phase to the sprayer.

16. The apparatus according to claim 12 further including a pressing roll positioned at the upper portion of each upright section for pressing-out components of the crystallate.

* * * * *